(12) United States Patent
Janzen et al.

(10) Patent No.: US 11,390,175 B2
(45) Date of Patent: Jul. 19, 2022

(54) ACCUMULATOR

(71) Applicant: Mahle International GmbH, Stuttgart (DE)

(72) Inventors: Caroline Janzen, Stuttgart (DE); Peter Nowak, Stuttgart (DE); Daniel Stehlik, Freiberg A. Neckar (DE)

(73) Assignee: Mahle International GmbH

( * ) Notice: Subject to any disclaimer, the term of this patent is extended or adjusted under 35 U.S.C. 154(b) by 266 days.

(21) Appl. No.: 16/724,158

(22) Filed: Dec. 20, 2019

(65) Prior Publication Data

US 2020/0198476 A1 Jun. 25, 2020

(30) Foreign Application Priority Data

Dec. 21, 2018 (DE) ...................... 10 2018 222 704.7

(51) Int. Cl.
*H01M 10/00* (2006.01)
*B60L 50/64* (2019.01)
(Continued)

(52) U.S. Cl.
CPC ................ *B60L 50/64* (2019.02); *B60K 1/04* (2013.01); *B60L 50/66* (2019.02);
(Continued)

(58) Field of Classification Search
CPC .. H01M 10/613; H01M 10/617; H01M 10/61; H01M 10/625; H01M 10/6554;
(Continued)

(56) References Cited

U.S. PATENT DOCUMENTS 10,446,812 B2   10/2019  Kim et al.
2005/0130033 A1*  6/2005  Iwamura ............... H01M 50/20
                                                   429/82
(Continued)

FOREIGN PATENT DOCUMENTS

CN       102468522 A      5/2012
CN       104661471 A      5/2015
(Continued)

OTHER PUBLICATIONS

English abstract for DE-10 2012 012 663.
(Continued)

*Primary Examiner* — Raymond Alejandro
(74) *Attorney, Agent, or Firm* — Fishman Stewart PLLC

(57) ABSTRACT

An accumulator for a hybrid or electric vehicle may include a housing having two shell-shaped housing parts abutting one another in a Z direction and forming an interior of the housing, a plurality of battery modules having a plurality of battery cells arranged in the interior of the housing, and at least one cooling device having a cooling chamber, through which a fluid is flowable, a fluid inlet for introducing the fluid into the cooling chamber, and a fluid outlet for discharging the fluid from the cooling chamber. The cooling chamber may be formed in a respective one of the two housing parts via a heat-conducting limiting plate, which may be spaced apart from a bottom of the respective housing part and may be aligned transversely to the Z direction and may separate the cooling chamber from the interior in a fluid-tight manner inside the respective housing part. At least some of the battery modules may abut on the limiting plate facing away from the cooling chamber so as to transfer heat.

20 Claims, 9 Drawing Sheets

(51) Int. Cl.
*B60K 1/04* (2019.01)
*B60L 50/60* (2019.01)
*H01M 10/613* (2014.01)
*H01M 10/625* (2014.01)
*H01M 10/6556* (2014.01)
*H01M 10/6554* (2014.01)
*H01M 50/20* (2021.01)

(52) U.S. Cl.
CPC ....... *H01M 10/613* (2015.04); *H01M 10/625* (2015.04); *H01M 10/6554* (2015.04); *H01M 10/6556* (2015.04); *H01M 50/20* (2021.01); *H01M 2220/20* (2013.01)

(58) Field of Classification Search
CPC ......... H01M 10/6555; H01M 10/6556; H01M 50/20; B60L 50/64; B60L 50/66; B60L 50/60; B60K 1/04
See application file for complete search history.

(56) References Cited

U.S. PATENT DOCUMENTS

| | | | |
|---|---|---|---|
| 2011/0318625 A1* | 12/2011 | Yajima | H01M 50/20 |
| | | | 429/120 |
| 2012/0208053 A1 | 8/2012 | Bender et al. | |
| 2014/0038020 A1* | 2/2014 | Murata | H01M 10/617 |
| | | | 429/120 |
| 2015/0145384 A1 | 5/2015 | Lee et al. | |
| 2018/0294450 A1 | 10/2018 | Haag et al. | |

FOREIGN PATENT DOCUMENTS

| | | |
|---|---|---|
| CN | 107431163 A | 12/2017 |
| CN | 207088971 U | 3/2018 |
| DE | 10 2011 000 695 A1 | 8/2012 |
| DE | 10 2012 012 663 A1 | 12/2013 |
| DE | 10 2018 108 321 A1 | 10/2018 |
| JP | 2007012486 A | 1/2007 |

OTHER PUBLICATIONS

Chinese Office Action dated Jan. 29, 2022 for copending Chinese App. No. 201911302535.3 (with English translation).
Chinese Search Report dated Jan. 12, 2022 for copending Chinese App. No. 201911302535.3 (with English translation).

* cited by examiner

ACCUMULATOR

CROSS-REFERENCE TO RELATED APPLICATIONS

This application claims priority to German Patent Application No. DE 10 2018 222 704.7, filed on Dec. 21, 2018, the contents of which are hereby incorporated by reference in their entirety.

TECHNICAL FIELD

The invention relates to an accumulator for a hybrid or electric vehicle.

BACKGROUND

Accumulators of a plurality of battery modules are installed in today's hybrid or electric vehicles. The battery modules thereby comprise a plurality of battery cells. The battery cells are usually cooled actively, in order to ensure an optimal performance and service life. For this purpose, a cooling plate, through which the coolant can flow, or also a plurality of individual cooling plates, through which the coolant can flow, are secured to the battery modules on one side so as to transfer heat, so that the battery cells of the respective battery modules can dissipate the generated heat to the coolant. If a plurality of cooling plates are present in the accumulator, they have to be fluidically connected to one another. The battery modules and the cooling plates are then arranged in a housing—usually made of metal. Due to the plurality of cooling plates, fluid connecting elements between the cooling plates, and the metallic housing, the accumulator has a comparatively large weight and a large installation space requirement. Due to the plurality of cooling plates and fluid connecting elements, a plurality of sealing points are further present in the accumulator, which need to be sealed in a complex manner. As a whole, the production of the generic accumulator is thus relatively expensive.

It is thus the object of the invention to specify an improved or at least alternative embodiment for an accumulator of the generic type, in the case of which the described disadvantages are overcome.

SUMMARY

This object is solved according to the invention by means of the subject matter of the independent claims. Advantageous embodiments are subject matter of the dependent claims.

The present invention is based on the general idea of reducing the number of the individual parts in an accumulator by means of a functional integration, and to thus reduce the weight, the installation space requirement, and the production costs of the accumulator. An accumulator is provided for a hybrid or electric vehicle and has a housing of two shell-shaped housing parts, which abut on one another in a Z direction and form an interior of the housing. The accumulator further has a plurality of battery modules comprising a plurality of battery cells, which are arranged in the interior of the housing. The accumulator furthermore has at least one cooling device, on which at least some of the battery modules abut so as to transfer heat. The cooling device thereby has a cooling chamber, through which a fluid can flow, a fluid inlet for introducing the fluid into the cooling chamber, and a fluid outlet for discharging the fluid from the cooling chamber. According to the invention, the cooling chamber of the at least one cooling device is formed in the respective housing part by means of a heat-conducting limiting plate. The limiting plate is thereby spaced apart from a bottom of the housing part and is aligned transversely to the Z direction and separates the cooling chamber from the interior in a fluid-tight manner inside the housing part. At least some of the battery modules thereby abut on the limiting plate, facing away from the cooling chamber, so as to transfer heat.

In the accumulator according to the invention, the cooling duct of the cooling device, which can be flown through, is limited by the bottom of the respective housing part on the one hand and by the limiting plate on the other hand. In other words, the bottom of the respective housing part forms a wall, which limits the cooling chamber, and material for producing the cooling device can be saved in an advantageous manner. The cooling chamber of the cooling device preferably extends over the entire bottom of the housing part, so that the number of the fluid connecting elements and accordingly of the sealing points is also reduced. The fluid inlet and the fluid outlet can then advantageously be molded integrally in the respective housing part and can fluidically connect the cooling chamber to the outside without further sealing points. At least some of the battery modules then abut on the limiting plate inside the interior so as to transfer heat, and can dissipate the heat to the fluid via said limiting plate. The limiting plate can be made, for example, of metal or of another heat-conducting material. The fluid is advantageously suitable to absorb the heat generated in the battery cells and can be, for example, a coolant. As a whole, the number of the individual parts is reduced in the accumulator according to the invention, and the weight, the installation space, and also the production costs of the accumulator can thus be reduced significantly.

To further reduce the weight of the accumulator, the housing can be made of plastic, preferably by means of injection molding. The plastic can then be polyamide or polypropylene, preferably each comprising a glass fiber content. The thickness of the housing can be, for example, between 2 and 3 mm. To stiffen the housing, a plurality of stiffening ribs can be formed at at least one of the housing parts on the inside or on the outside. To improve the electromagnetic compatibility of the accumulator and to protect the battery modules against external electromagnetic interference fields, the housing made of plastic can have a shield layer on the outside, preferably of aluminum. Alternatively or additionally, an additional material of the housing made of plastic can have a shielding effect. The additional material is then advantageously admixed to the plastic of the housing. Alternatively or additionally, the two housing parts can be sealed fluidically to the outside relative to one another by means of a circumferential shield seal. Alternatively, the two housing parts can be fluidically sealed to the outside relative to one another by means of a circumferential seal and a shield seal. The shield seal as well as the seal can be O-shaped.

Advantageously, it can be provided that the limiting plate is fluidically sealed from the respective housing part by means of a circumferential floating seal, preferably of a silicon-based adhesive. Due to the floating seal, the fluid cannot reach from the cooling chamber into the interior of the housing. The limiting plate is thereby floatingly supported on the respective housing part by means of the floating seal, so that the limiting plate and the housing part do not abut on one another end to end at any point. Different heat expansions of the limiting plate and of the respective housing part can be compensated in this way and the otherwise appearing tensions in the limiting plate or in the housing part can thus be avoided. Advantageously, the limiting plate can then be formed of a different material than the respective housing part. For example the respective housing part or the housing, respectively, can thus be made of plastic, and the limiting plate can be made of metal, without the appearance of a sealing problem during operation.

To be able to evenly cool the battery modules abutting on the limiting plate, a flow pattern can be formed in the bottom of the respective housing part and/or at the limiting plate, facing the cooling chamber. Due to the flow pattern, the fluid can be guided from the fluid inlet to the fluid outlet. In other words, a fluid distributor for distributing the fluid from the fluid inlet into the cooling chamber, and a fluid collector for collecting the fluid from the cooling chamber to the fluid outlet, as well as the individual cooling ducts leading to the battery modules can be shown by the flow pattern and can thus be integrated into the cooling chamber. The flow pattern thereby preferably has a plurality of burls or a plurality of turbulence ducts, through which the fluid can be guided systematically through the cooling chamber. The fluid can thus be guided for example in a U-shaped manner through the cooling chamber. However, other fluid guides through the fluid duct are generally also possible.

It can advantageously be provided that a heat-transferring layer is arranged at the limiting plate, facing away from the cooling chamber. The layer can thereby improve a heat-transferring contact between the limiting plate and the battery modules abutting thereon, so that the battery cells in the battery modules abutting on the limiting plate can be cooled efficiently. The layer can be, for example, a heat conducting film or a heat conducting paste or a heat conducting coating.

In the case of a further development of the accumulator according to the invention, it is provided that the accumulator has a battery electric box, which is arranged inside the interior in the housing. The battery electric box thereby abuts on the limiting plate of the at least one cooling device so as to transfer heat and can also be cooled by the cooling device. The performance of the battery electric box can thus be improved and an overheating of electrical components of the battery electric box can be prevented. Advantageously, the battery electric box can have dimensions comparable or almost identical with the respective battery module, respectively, so that the battery electric box instead of one of the battery modules can be arranged in the housing. The arrangement and the securing of the battery modules and of the battery electric box in the housing can be simplified significantly in this way. Advantageously, the battery electric box is electrically contacted with the individual battery modules in the accumulator. For example a high-voltage contacting between the individual battery modules and the battery electric box can thus be realized by means of copper current bars, which are encased in an insulating manner. The battery modules can thereby be connected among one another, for example in series, wherein other interconnection diagrams are also conceivable.

In the case of an advantageous embodiment of the housing, it can be provided that the two housing parts are formed as identical parts. Such a design of the housing simplifies the production of the housing, so that the production costs can be reduced. If the housing is made, for example, of plastic by means of injection molding, the two housing parts can be made with the same injection molding tool. The small differences in the housing parts, which are still present, can then be realized by means of slides or inserts in the injection molding tool.

Advantageously, the battery modules inside the housing can be arranged in two planes arranged on top of one another. The accumulator can then in each case have a cooling device in the respective housing part, wherein the one plane of the battery modules is arranged in the one housing part at the one cooling device, and the other plane of the battery modules is arranged in the other housing part at the other cooling device so as to transfer heat. If the accumulator has a battery electric box arranged in the housing, said battery electric box can have dimensions comparable or almost identical with the respective battery module, respectively. The battery electric box can then replace a battery module in one of the planes and can thus be arranged in the housing in a space-saving manner.

The respective battery modules in the respective planes and the battery modules of the two planes are advantageously electrically interconnected among one another and optionally with the battery electric box. In the case of the battery modules in the respective planes, the high-voltage connection can be realized, for example, by means of copper current bars which are encased in an insulating manner. The battery modules can thereby be connected among one another, for example in series, wherein other interconnection diagrams are also conceivable. The two planes of the battery modules can be electrically interconnected with one another by means of a high-voltage connection and a low-voltage connection. The high-voltage connection between the two planes of the battery modules can compensate assembly and manufacturing tolerances as well as a different plug-in depth, and can be realized in the form of a self-finding flat plug. Advantageously, a plug-and-play principle can be realized in the high-voltage connection. As intended, the high-voltage connection then does not engage, so as to simplify the maintenance and the disassembly of the two housing parts from one another. The low-voltage connection between the two planes of the battery modules can be realized, for example, by means of a plug and a cable, which are manually interconnected with one another. When bringing together the two housing parts with the battery modules arranged and interconnected therein and optionally with the battery electric box, the high-voltage connection between the two planes is then established automatically by means of the self-finding high-voltage connection, and the low-voltage connection can subsequently take place by means of a manual interconnection of the low-voltage connection.

To secure the battery modules in the housing, it can advantageously be provided that a plurality of spacers is arranged inside the housing. The spacers are preferably secured spaced apart from one another at at least one holding frame, in order to simplify the assembly of the spacers in the interior. The battery modules of the respective plane can thereby be secured to one another and spaced apart from the respective housing part by means of the spacers. Alternatively or additionally, the spacers can secure the two planes of the battery modules spaced apart from one another. The spacers provide for a fixation of the battery cell modules in the respective housing part and in the respective plane. They further provide for a power transfer between the battery modules in the two planes to one another. Different designs of the spacers are conceivable thereby. For example, a holding frame comprising the spacers, which secure the battery modules of the corresponding plane spaced apart from one another, can thus be arranged in each of the housing parts. The two planes are then secured to the respective holding frame spaced apart from one another by means of the spacers. Alternatively, an individual holding frame comprising the spacers, which secure the battery modules in the two planes and the two planes spaced apart from one another, can be arranged between the two planes. Advantageously, the holding frame can also have or form a contact protection for high-voltage connection. Plugs and cables of a low-voltage connection can further also be secured to the holding frame. Alternatively, the spacers can be arranged individually in the housing without a holding frame, and can secure the battery modules in the two planes and the two planes spaced apart from one another.

In the case of an advantageous further development of the accumulator according to the invention, it is provided that the two housing parts are clamped to one another by means of a plurality of threaded rods, which penetrate the housing, and are thus secured to one another. The battery modules are thereby secured to the housing by means of the respective threaded rods at a plurality of—but at least at two—initial fastening points. The limiting plate of the at least one cooling device is then clamped between the respective abutting battery modules and the respective housing part in the Z direction. The threaded rods thereby preferably do not pass through the limiting plate, so that no unwanted sealing points are created in the accumulator on the one hand, and that the floating support of the limiting plate on the respective housing part is not negatively impacted on the other hand. The threaded rods can be, for example, self-tapping, whereby thickenings for accommodating the threaded rods can then be provided at the respective housing parts. If the battery modules are arranged in two planes in the housing and are secured spaced apart from one another by means of the spacers, the threaded rods can penetrate the spacers. The battery modules of the two planes are thus clamped to one another and to the two housing parts in the housing. The respective limiting plate of the cooling device is thus securely clamped between the respective housing part and the abutting battery modules, so that the stability of the cooling device is significantly increased. If the housing is sealed to the outside by means of the shield seal and/or the seal, it can also be clamped between the housing parts.

To improve the stability of the accumulator, the respective battery modules can be secured to the respective housing part at a plurality of—but at least at two—secondary fastening points. They are thereby preferably screwed to the respective housing part by means of self-tapping screws. The screws thereby preferably do not pass through the limiting plate, so that no unwanted sealing points are created in the accumulator on the one hand, and that the floating support of the limiting plate on the respective housing part is not negatively impacted on the other hand. To accommodate the screws, thickenings can be provided at the respective housing parts. The screw depth of the respective screws in the respective depressions is then preferably at least twice as high as the thread diameter. If the spacers are secured in the housing, the respective screws can be accommodated in the spacers on one side and can thus additionally be fixed in the housing. The respective battery module is advantageously secured in the housing at least at the two initial fastening points and at the two secondary fastening points, so that the stability of the accumulator is significantly increased.

If the accumulator has a battery electric box, the initial fastening points and/or secondary fastening points for the respective battery modules and for the battery electric box can be identical. The assembly and the setup of the accumulator as a whole can thus be significantly simplified. Advantageously, the battery electric box then has comparable or virtually identical dimensions, respectively, with the respective battery modules.

In summary, the number of the individual parts is reduced in the accumulator according to the invention, so that the weight, the installation space requirement, and the production costs of the accumulator can be reduced. The setup of the accumulator can be further simplified and its weight can be further reduced by means of further advantageous embodiments of the accumulator.

Further important features and advantages of the invention follows from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
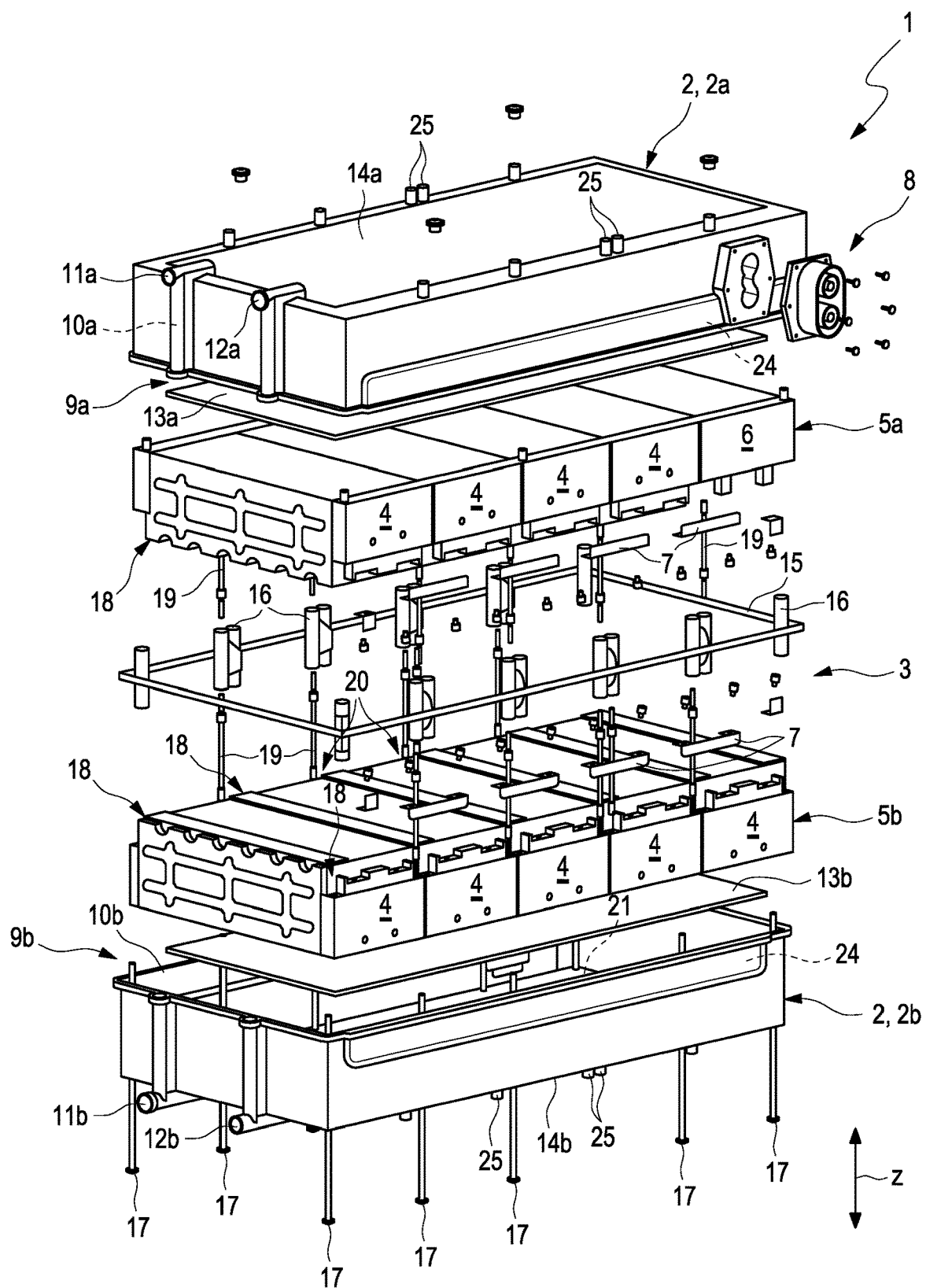
FIG. 1 shows an exploded view of an accumulator according to the invention.
Figure 2:
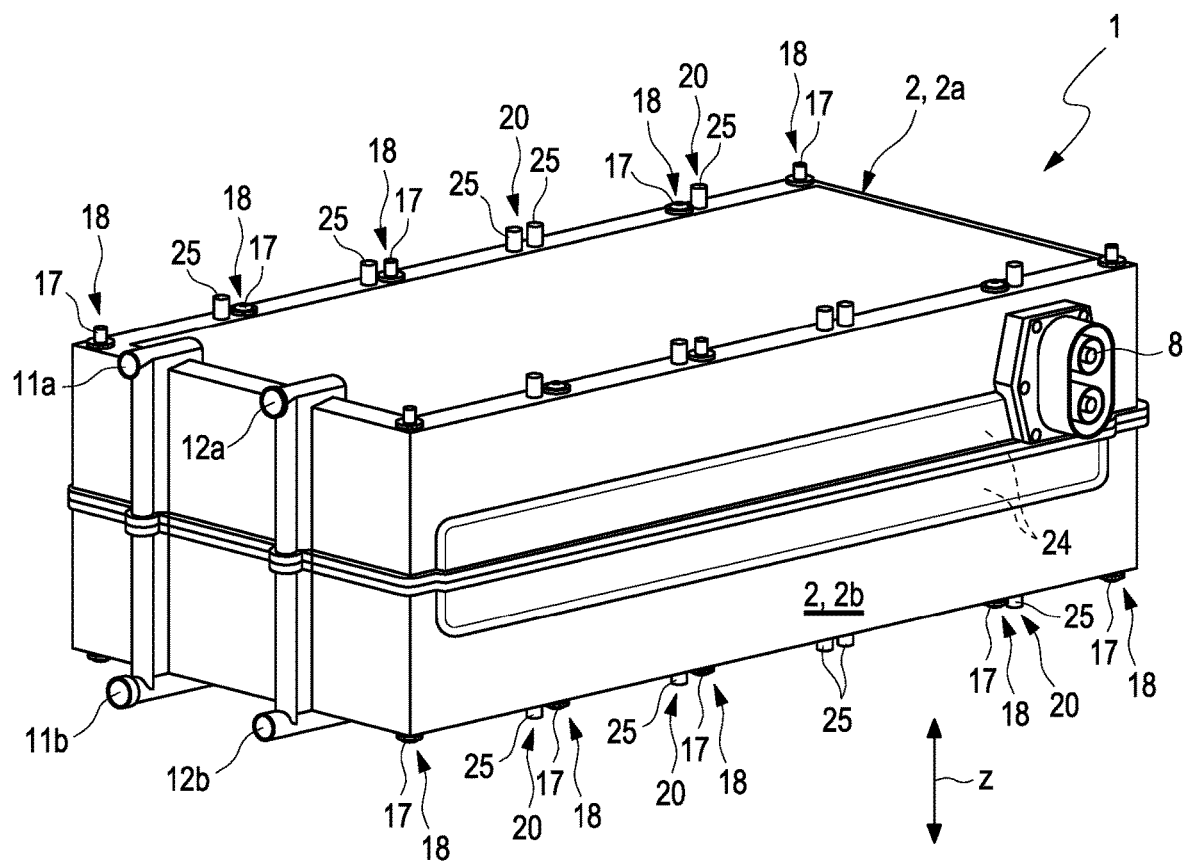
FIG. 2 shows a view of the assembled accumulator according to the invention.
Figure 13:
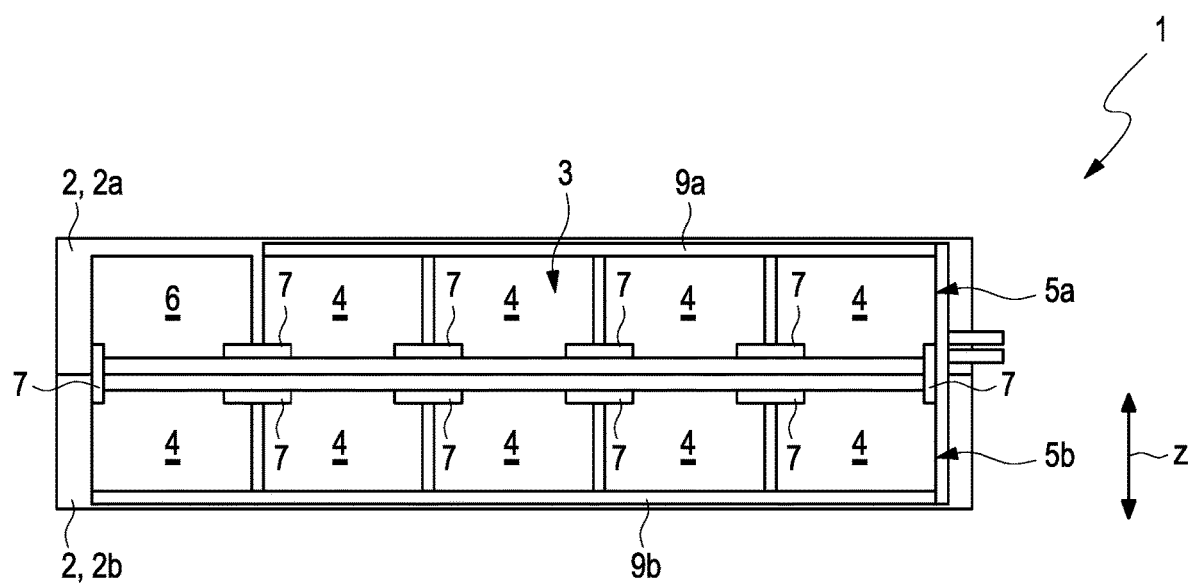
FIG. 13 shows an interconnection diagram of the battery modules in the accumulator according to the invention.

FIG. 1 shows an exploded view of an accumulator 1 according to the invention for a hybrid or electric vehicle. FIG. 2 shows a view of the assembled accumulator 1. The accumulator 1 thereby has a housing 2 of two shell-shaped housing parts 2a and 2b, which are secured to one another in the Z direction. The two housing parts 2a and 2b are formed as identical parts and can be made, for example, of plastic. Between the two housing parts 2a and 2b there is formed an interior 3 of the housing 2, in which battery modules 4 comprising a plurality of battery cells—not shown here—are arranged. The battery modules 4 are thereby arranged inside the housing 2 in two planes 5a and 5b arranged on top of one another, wherein the respective planes 5a and 5b of the battery modules 4 are secured in the respective housing parts 2a and 2b. In the plane 5a, one of the battery modules 4 is thereby replaced by a battery electric box 6, which has comparable or virtually identical dimensions, respectively, with the respective battery modules 4. The battery modules 4 are electrically interconnected with one another within the respective planes 5a and 5b, and the respective planes 5a and 5b are electrically interconnected with one another by means of a copper current bar 7 each, as is shown in FIG. 13. The battery modules 4 are then electrically contacted to the outside via the battery electric box 6, for the purpose of which a power connector 8 for the battery electric box 6 is provided in the housing part 2a.

The accumulator 1 further has two cooling devices 9a and 9b, which each have a cooling chamber 10a and 10b, through which the fluid can flow, a fluid inlet 11a and 11b, and a fluid outlet 12a and 12b. The cooling devices 9a and 9b are arranged inside the interior 3 in the respective housing part 2a and 2b. The respective cooling chamber 10a and 10b is thereby in each case formed by a heat-conducting limiting plate 13a and 13b, which is arranged inside the respective housing parts 2a and 2b, in each case spaced apart from its bottom 14a and 14b. The respective limiting plate 13a and 13b separates the respective cooling chamber 10a and 10b from the interior 3 in a fluid-tight manner. The respective plane 5a and 5b of the battery modules 4 then abuts on the respective limiting plate 13a and 13b so as to transfer heat, so that the battery modules 4 can dissipate the generated heat via the respective limiting plate 13 and 13b to the fluid in the cooling chamber 10a and 10b. In the plane 5a, the battery electric box 6 abuts on the limiting plate 13a in the same way so as to transfer heat and is also cooled by the cooling device 9a. A holding frame 15 comprising a plurality of spacers 16 is arranged in the housing 2 between the two planes 5a and 5b. The spacers 16 thereby place the battery modules 4 in the respective plane 5a and 5b as well as the two planes 5a and 5b spaced apart from one another in the Z direction.

The two housing parts 2a and 2b are clamped to one another by means of a plurality of threaded rods 17, which penetrate the housing 2, and are thus secured to one another. The threaded rods 17 thereby pass through accommodation openings in the respective spacers 16 and additionally secure them in the housing 2. The limiting plates 13a and 13b, the battery modules 4 of the two planes 5a and 5b, and the holding frame 15 comprising the spacers 16 are then clamped between the two housing parts 2a and 2b. The stability of the accumulator 1 is thus significantly increased. Due to the respective threaded rods 17, the battery modules 4 are furthermore secured to the housing 2 at two initial fastening points 18 in each case—see also FIG. 11 with regard to this. The respective battery module 4 is further screwed to the respective housing part 2a and 2b by means of the self-tapping screws 19 at two secondary fastening points 20—see also FIG. 12 with regard to this. Thickenings 25 are provided for the screws 19 at the respective housing part 2a and 2b, so that the screws 19 can be securely secured to the housing 2. Inside the housing 2, the screws 19 are accommodated on one side by the respective spacers 16, so that the screws 19 do not shift. For this purpose, a penetrating accommodating opening is provided in the respective spacer 16. Advantageously, the threaded rods 17 and the screws 19 do not penetrate the limiting plates 13a and 13b of the cooling devices 9a and 9b, so that no additional sealing points are created in the interior 3. The initial fastening points 18 and the secondary fastening points 20 for the respective battery modules 4 and for the battery electric box 6 are further formed identically, whereby the assembly and the setup of the accumulator 1 is significantly simplified. Further details with regard to the accumulator 1 will be described in more detail on the basis of FIG. 3 to FIG. 13.

Figure 3:
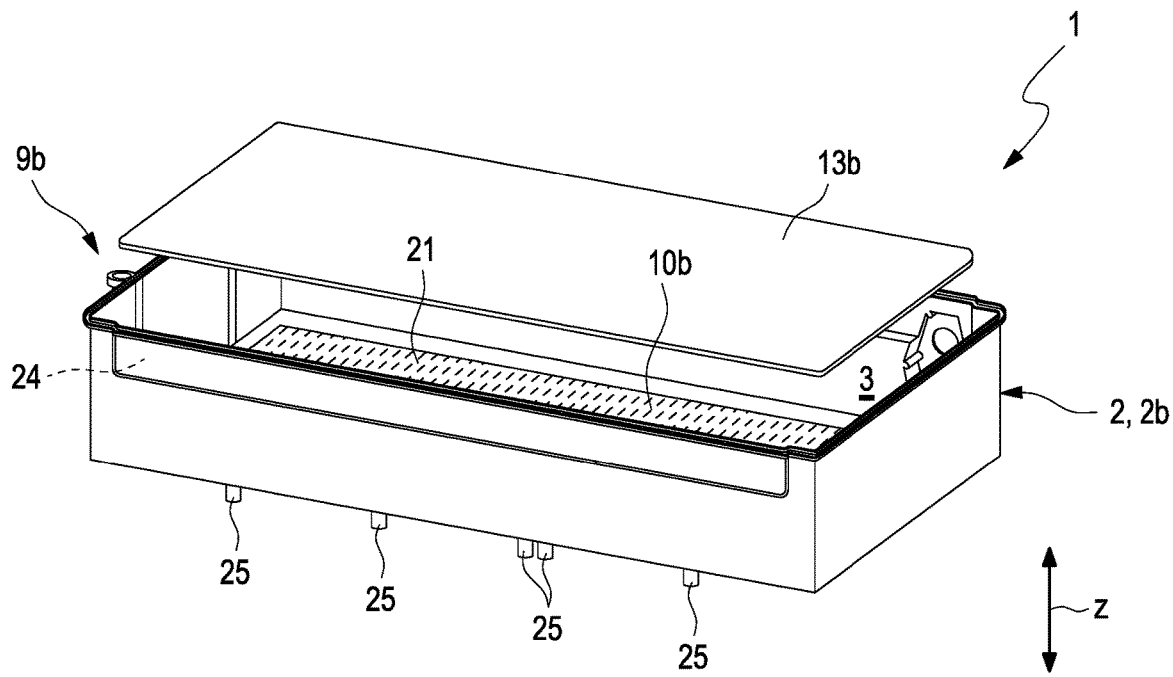
FIG. 3 shows an exploded view of a cooling device in the accumulator according to the invention.

FIG. 3 shows an exploded view of the cooling device 9b in the housing part 2b. The cooling chamber 10b, which can be flown through, is limited by the bottom 14b of the housing part 2b on the one hand and by the limiting plate 13b on the other hand. The cooling chamber 10b thereby extends over the entire bottom 14b and no fluid connecting elements are installed in the interior 3. The fluid inlet 11b and the fluid outlet 12b—see FIG. 1 and FIG. 2 with regard to this—are furthermore molded integrally in the housing part 2b, so that the cooling chamber 10b is fluidically connected to the outside without further sealing points. Facing the cooling chamber 10b, a flow pattern 21, which guides the fluid from the fluid inlet 11b to the fluid outlet 12b in a U-shaped manner, is formed in the bottom 14b of the housing part 2b. However, other fluid guides through the cooling chamber 10b, are also conceivable. The cooling device 9a is formed identically to the cooling device 9b shown here. In response to the assembly of the accumulator 1, the respective limiting plates 13a and 13b can thus be arranged and secured in the respective housing part 2a and 2b in a first step.

Figure 4:
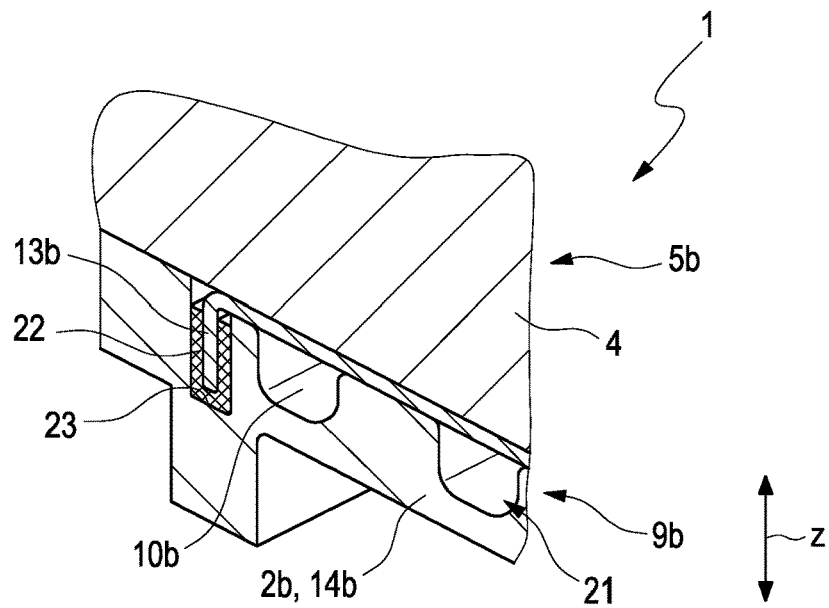
FIG. 4 shows a sectional view of a floating support in the cooling device of the accumulator according to the invention.

FIG. 4 shows a sectional view at the cooling device 9b. As shown here, the limiting plate 13b is fluidically sealed from the housing part 2b by means of a circumferential floating seal 22. The floating seal 22 is preferably made of a silicon-based adhesive. The floating seal 22 is arranged in a sealing groove 23 and accommodates the limiting plate 13b in a floating manner, so that the limiting plate 13b and the housing part 2b do not contact one another at any point. Due to the floating support of the limiting plate 13b, the housing part 2b and the limiting plate 13b can be made of different materials. For example, the limiting plate 13b can thus be made of metal, such as aluminum, and the housing part 2b can be made of plastic. The limiting plate 13a of the cooling device 9a is supported on the housing part 2a identically to the limiting plate 13b shown here.

Figure 5:
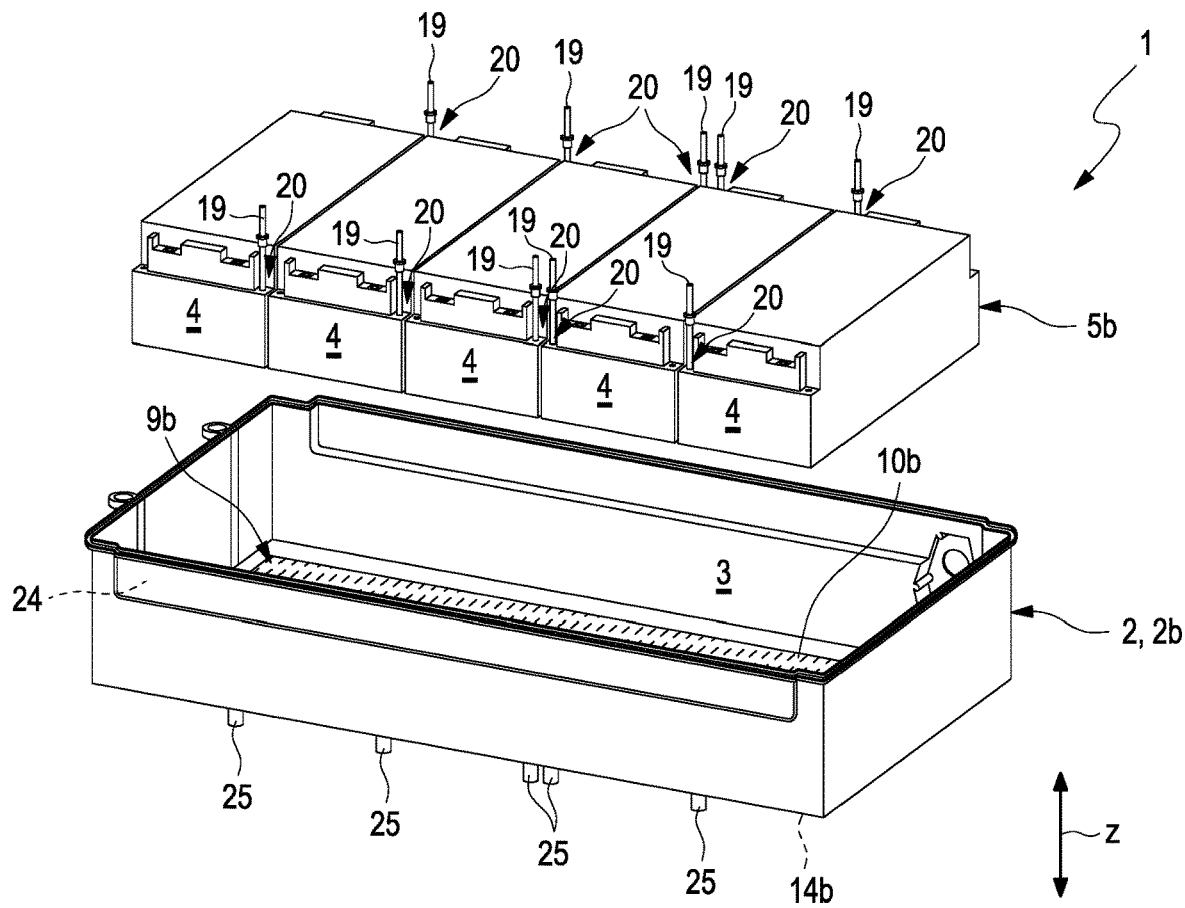
FIGS. 5 and 6 show an exploded view and a view of battery modules secured in a housing part in the accumulator according to the invention.
Figure 6:
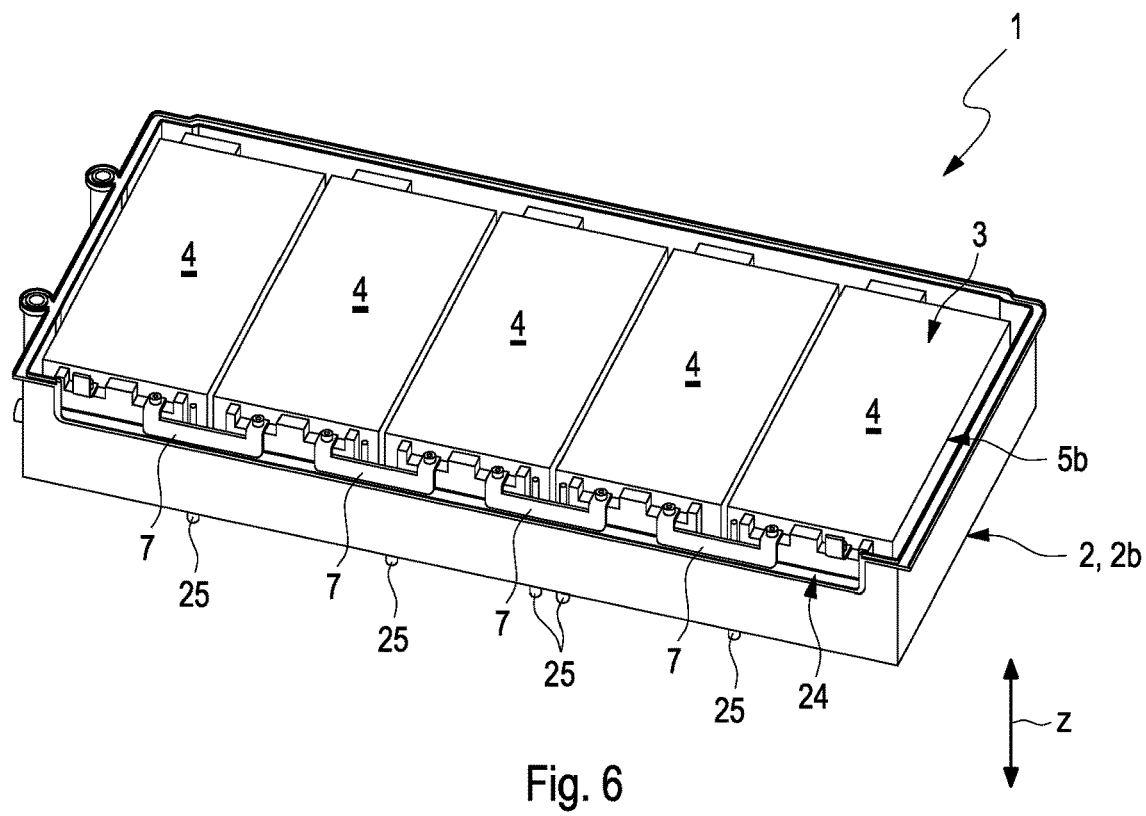

FIG. 5 shows an exploded view and FIG. 6 shows a view of the battery modules 4, which are secured in the housing part 2b. The battery modules 4 are thereby screwed to the housing part 2b by means of self-tapping screws 19 at the secondary fastening points 20, and are electrically interconnected with one another by means of the copper current bars 7. In response to the assembly of the accumulator 1, the battery modules 4 can be arranged in the housing part 2b, can be screwed thereto, and can subsequently be electrically interconnected with one another by means of a closable assembly opening 24 in a second step. The battery modules 4 and the battery electric box 6 can then also be arranged and secured in the housing part 2a in the same way.

Figure 7:
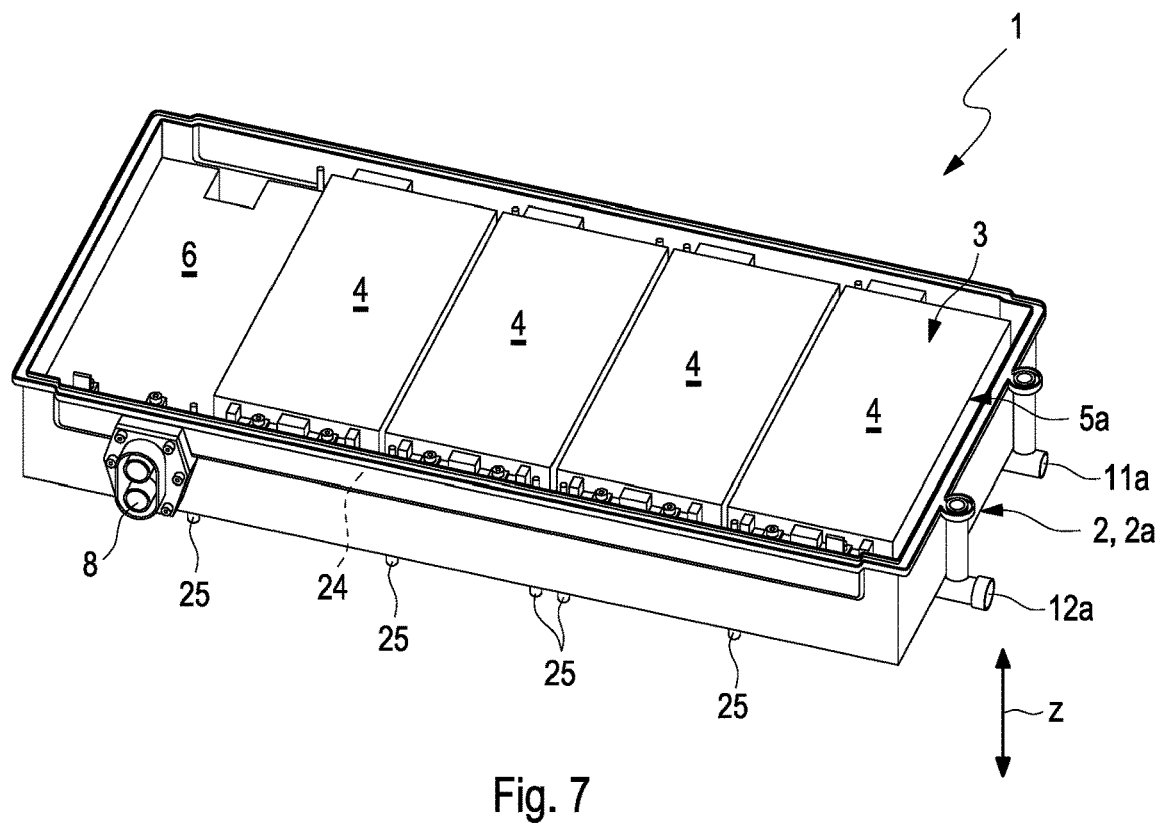
FIGS. 7 and 8 show views of housing parts comprising the battery modules arranged therein in the accumulator according to the invention.
Figure 8:
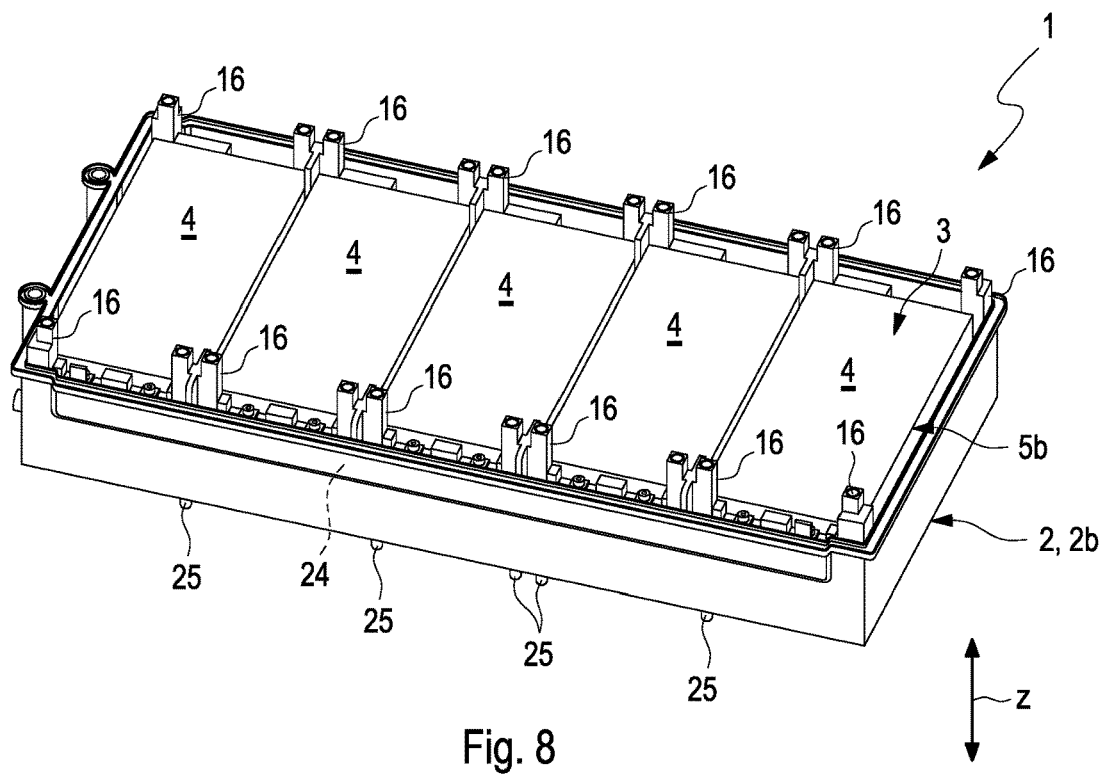
Figure 12:
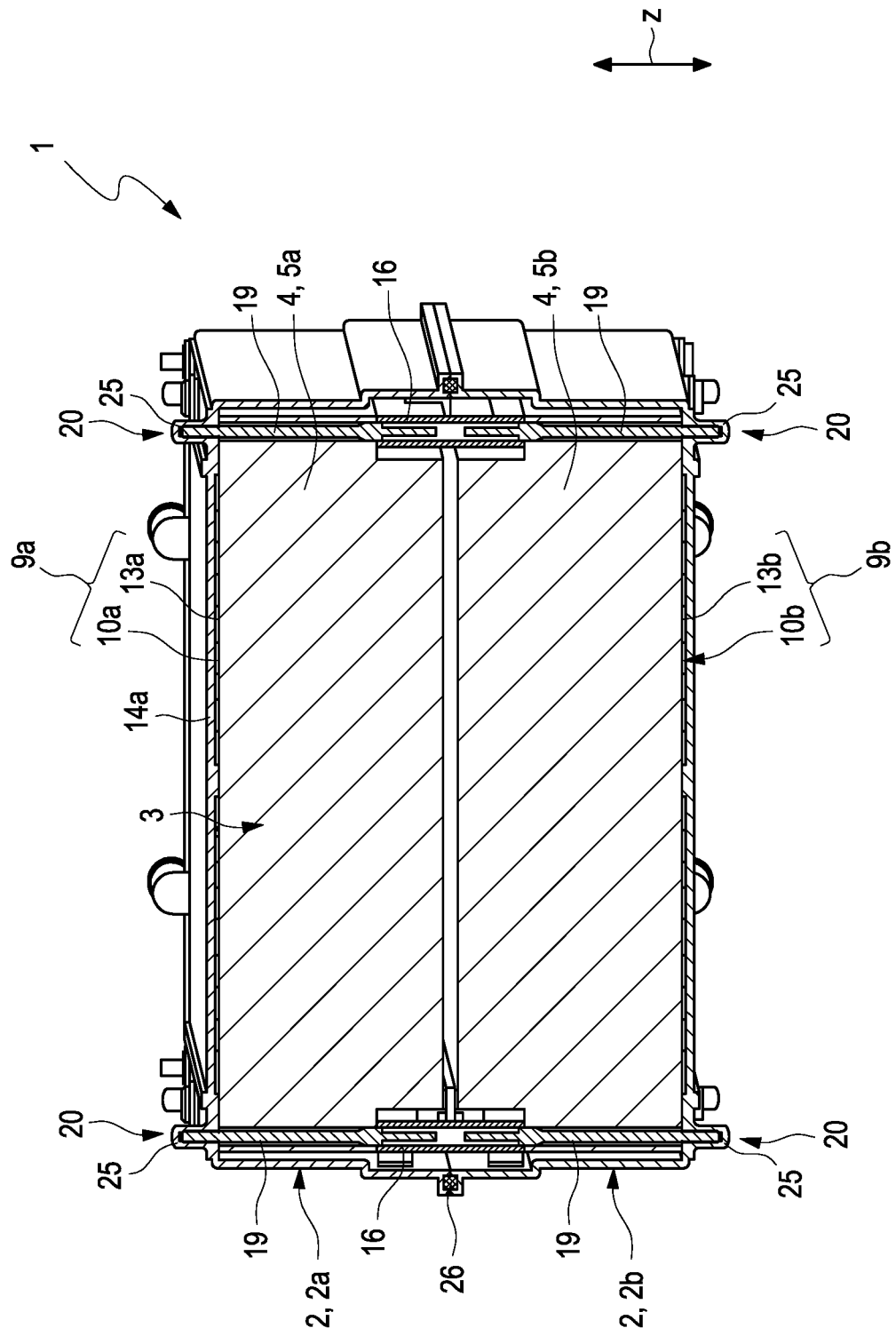
FIG. 12 shows a sectional view of the accumulator according to the invention at screws.

FIG. 7 shows a view of the housing part 2a and FIG. 8 shows a view of the housing part 2b comprising secured battery modules 4. In the housing part 2a, one of the battery modules 4 is replaced by the battery electric box, which, however, is secured in the housing part 2a by means of the screws 19 in the same way as the battery modules 4. The holding frame 15 comprising the spacers 16 is already arranged in the housing part 2b. The spacers 16 thereby accommodate the screws 19 on one side, as shown in FIG. 12. In response to the assembly of the accumulator 1, the holding frame 15 comprising the spacers 16 is thus arranged in one of the housing parts 2a or 2b in a third step.

Figure 9:
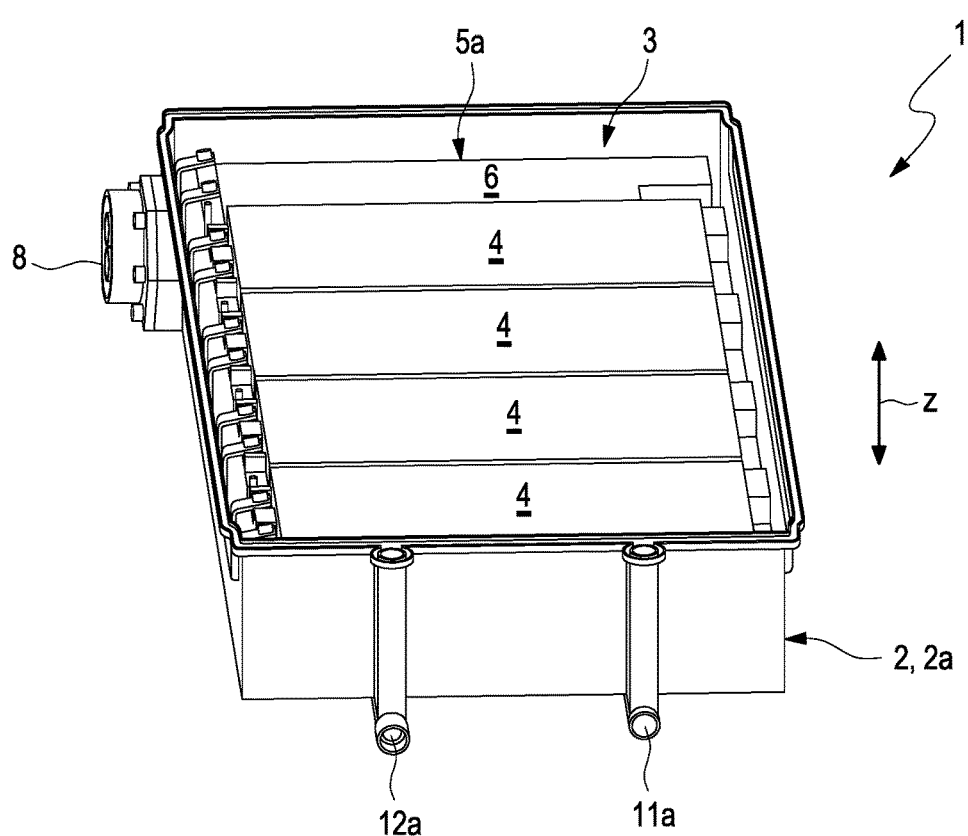
FIGS. 9 and 10 show further views of the housing parts from FIG. 7 and FIG. 8 in the accumulator according to the invention.
Figure 10:
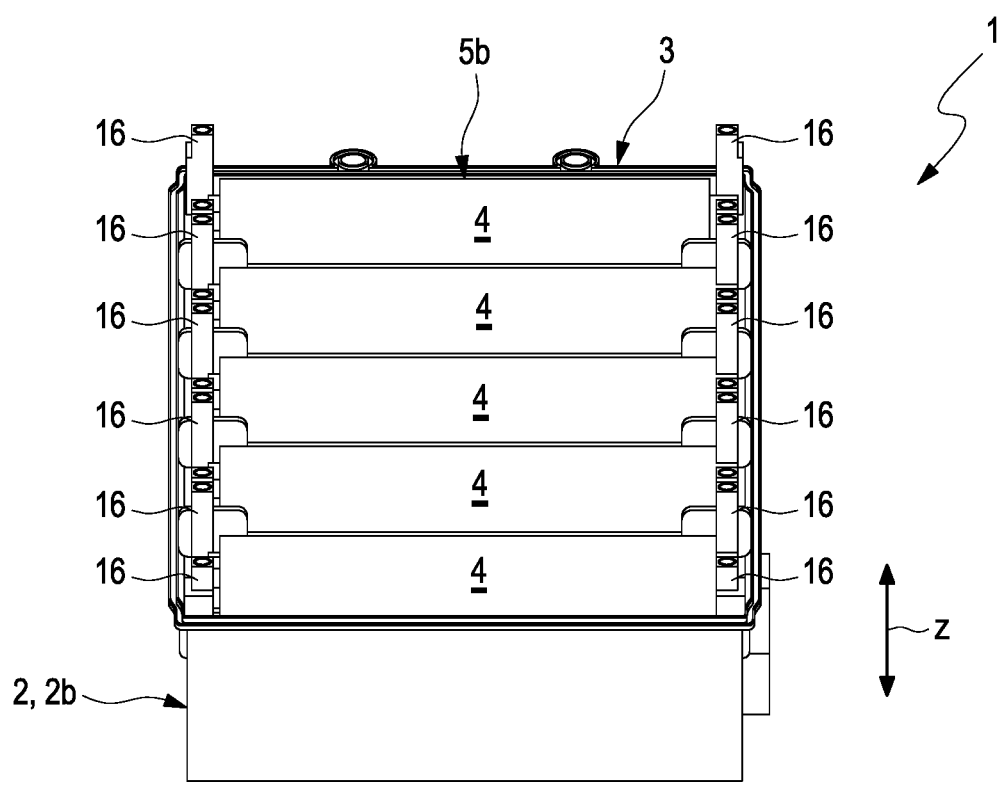

FIG. 9 and FIG. 10 show further views of the two housing parts 2a and 2b from FIG. 7 and FIG. 8. The two housing parts 2a and 2b can now be arranged on one another here in response to the assembly in a fourth step, and can be clamped to one another in the Z direction by means of threaded rods 17. After the clamping of the two housing parts 2a and 2b to one another, the accumulator 1 is now created, as it is shown in FIG. 2.

Figure 11:
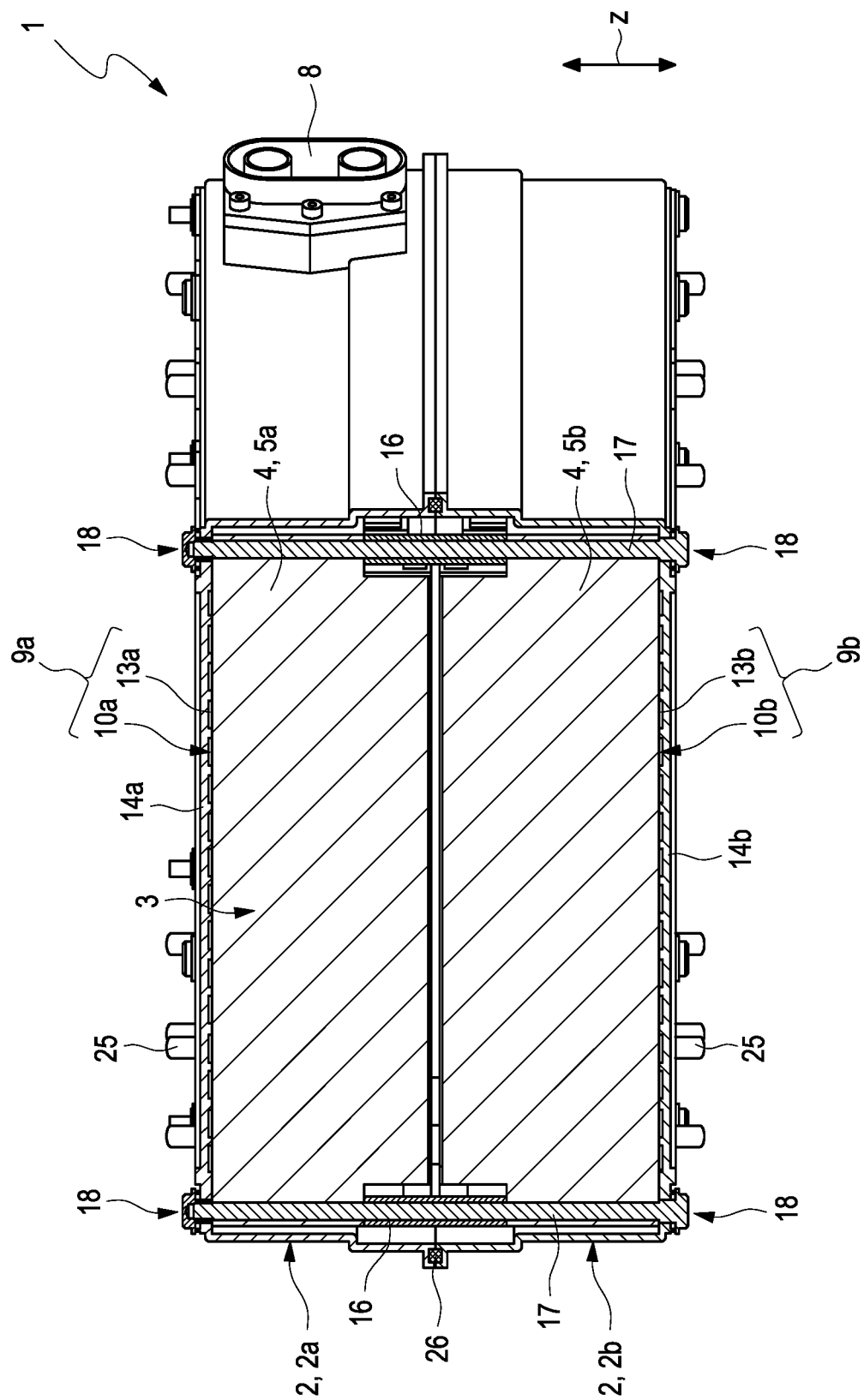
FIG. 11 shows a sectional view of the accumulator according to the invention at threaded rods.

FIG. 11 shows a sectional view of the accumulator 1 at the threaded rods 17. The threaded rods 17 penetrate the housing 2 and clamp the respective limiting plates 13a and 13b as well as the battery modules 4 of the two planes 5a and 5b between the housing parts 2a and 2b. The threaded rods 17 thereby pass through the accommodation openings of the spacers 16 and are thus additionally fixed in the housing 2. The threaded rods 17 thereby do not penetrate the respective limiting plates 13a and 13b, so that no unwanted sealing points are created in the interior 3. The respective battery modules 4 are thereby secured in the housing 2 by means of the threaded rods 17 at the two initial fastening points 18.

FIG. 12 shows a sectional view of the accumulator 1 at the self-tapping screws 19. The screws 19 secure the respective battery modules 4 in the respective housing part 2a and 2b at the two secondary fastening points 20. The respective screws 19 are thereby accommodated in the respective thickening 25 on the one hand and in the accommodating opening in the respective spacer 16 on the other hand. The screw depth of the respective screws 19 in the respective thickening 25 is then preferably at least twice as high as the thread diameter. The screws 19 do not pass through the limiting plates 13a and 13b, so that no unwanted sealing points are created in the interior 3.

As can be seen in FIG. 11 and FIG. 12, a seal 26 is arranged between the two housing parts 2a and 2b, which seal is clamped to said housing parts. In the shown accumulator 1 according to FIG. 1 to FIG. 12, the initial fastening points 18 and the secondary fastening points 20 at the respective battery module 4 are in each case arranged opposite one another However, a diagonal arrangement of the initial fastening points 18 and of the secondary fastening points 20 at the respective battery module 4 is generally also conceivable.

FIG. 13 now shows a possible interconnection diagrams of the battery modules 4 in the accumulator 1. The battery modules 4 are in each case connected to one another in series here and are interconnected with the battery electric box 6. However, other interconnection diagrams are generally also conceivable.

The invention claimed is:

1. An accumulator for a hybrid or electric vehicle, comprising:
a housing having two shell-shaped housing parts, which abut on one another in a Z direction and form an interior of the housing;
a plurality of battery modules having a plurality of battery cells, which are arranged in the interior of the housing; and
at least one cooling device, which has a cooling chamber, through which a fluid is flowable, a fluid inlet for introducing the fluid into the cooling chamber, and a fluid outlet for discharging the fluid from the cooling chamber;
wherein the cooling chamber is formed in a respective one of the two housing parts via a heat-conducting limiting plate;
the limiting plate is spaced apart from a bottom of the respective one of the two housing parts and is aligned transversely to the Z direction and separates the cooling chamber from the interior in a fluid-tight manner inside the respective one of the two housing parts; and
at least some of the battery modules abut on the limiting plate facing away from the cooling chamber so as to transfer heat.

2. The accumulator according to claim 1, wherein:
the limiting plate is fluidically sealed from the respective one of the two housing parts via a circumferential floating seal; and
the limiting plate is floatingly supported on the respective one of the two housing parts via the floating seal.

3. The accumulator according to claim 1, wherein a flow pattern is formed at least one of in the bottom of the respective one of the two housing parts and at the limiting plate, facing the cooling chamber.

4. The accumulator according to claim 1, wherein a heat-transferring layer, which facilitates a heat-transferring contact between the limiting plate and the at least some of the battery modules arranged at the limiting plate, is arranged at the limiting plate, facing away from the cooling chamber.

5. The accumulator according to claim 1, further comprising a battery electric box arranged inside the interior of the housing, the battery electric box abutting on the limiting plate so as to transfer heat.

6. The accumulator according to claim 1, wherein the two housing parts are formed as identical parts.

7. The accumulator according to claim 1, wherein:
the battery modules inside the housing are arranged in two planes arranged on top of one another, and the at least one cooling device includes a cooling device in each of the two housing parts; and
one of the two planes is arranged in one housing part at the one respective cooling device, and the other of the two planes is arranged in the other housing part at the other respective cooling device so as to transfer heat.

8. The accumulator according to claim 7, characterized in wherein:
a plurality of spacers is arranged inside the housing; and
at least one of (i) the battery modules of each respective plane are secured to one another and spaced apart from the respective housing part via the spacers, and (ii) the two planes of the battery modules are secured spaced apart from one another via the spacers.

9. The accumulator according to claim 1, wherein:
the two housing parts are clamped to one another via a plurality of threaded rods, which penetrate the housing, and are thus secured to one another;
the battery modules are secured to the housing via the respective threaded rods at at least at two initial fastening points; and
the limiting plate is clamped between the respective abutting battery modules and the bottom of the respective one of the two housing parts.

10. The accumulator according to claim 1, the at least some of the battery modules are secured to the respective one of the two housing parts at at least at two fastening points.

11. The accumulator according to claim 9, wherein:
a battery electric box is arranged inside the interior of the housing, the battery electric box abutting on the limiting plate so as to transfer heat;
the battery modules are secured to the respective one of the two housing parts at at least at two, secondary fastening points; and
at least one of (i) the initial fastening points and (ii) the secondary fastening points for the battery modules (4)

and are identical to at least one of initial fastening points and secondary fastening points of the battery electric box.

12. The accumulator according to claim 2, wherein the circumferential floating seal is a silicon-based adhesive.

13. The accumulator according to claim 3, wherein the flow pattern includes a plurality of burls or a plurality of turbulence ducts.

14. The accumulator according to claim 8, wherein the plurality of spacers are secured spaced apart from one another at at least one holding frame.

15. The accumulator according to claim 10, wherein the at least some of the battery modules are screwed to the respective one of the two housing parts at the at least at two fastening points via self-tapping screws.

16. An accumulator for a hybrid or electric vehicle, comprising:
a housing having two shell-shaped housing parts, which abut on one another in a Z direction and form an interior of the housing;
a plurality of battery modules having a plurality of battery cells, which are arranged in the interior of the housing in two planes arranged one on top of the other; and
two cooling devices each in one of the two housing parts, each having a cooling chamber, through which a fluid is flowable, a fluid inlet for introducing the fluid into the cooling chamber, and a fluid outlet for discharging the fluid from the cooling chamber;
wherein the cooling chamber is formed in a respective one of the two housing parts via a heat-conducting limiting plate;
wherein the limiting plate is spaced apart from a bottom of the respective one of the two housing parts and is aligned transversely to the Z direction and separates the cooling chamber from the interior in a fluid-tight manner inside the respective one of the two housing parts; and
wherein one of the two planes is arranged in one housing part at the one respective cooling device, and the other of the two planes is arranged in the other housing part at the other respective cooling device so as to transfer heat.

17. The accumulator according to claim 16, wherein:
a plurality of spacers is arranged inside the housing; and
at least one of (i) the battery modules of each respective plane are secured to one another and spaced apart from the respective housing part via the spacers, and (ii) the two planes of the battery modules are secured spaced apart from one another via the spacers.

18. The accumulator according to claim 16, wherein:
each limiting plate is fluidically sealed from the respective one of the two housing parts via a circumferential floating seal; and
each limiting plate is floatingly supported on the respective one of the two housing parts via the floating seal.

19. The accumulator according to claim 17, wherein a flow pattern is formed at least one of in the bottom of each housing part and at each limiting plate, facing the respective cooling chamber.

20. The accumulator according to claim 17, wherein, for each limiting plate, a heat-transferring layer, which-facilitates a heat-transferring contact between the respective limiting plate and the at least some of the battery modules arranged at the respective limiting plate, is arranged at the respective limiting plate, facing away from the respective cooling chamber.

\* \* \* \* \*